United States Patent [19]

Sparkes

[11] 4,229,856
[45] Oct. 28, 1980

[54] WHEEL SUPPORT ARRANGEMENTS

[75] Inventor: Curtis A. Sparkes, Altringham, England

[73] Assignee: Lamondine S.A., Fribourg, Switzerland

[21] Appl. No.: 944,665

[22] Filed: Sep. 21, 1978

[30] Foreign Application Priority Data

Sep. 21, 1977 [GB] United Kingdom ............ 39240/77

[51] Int. Cl.² ............................................. B60B 33/00
[52] U.S. Cl. ......................................... 16/47; 16/31 R;
403/203; 403/224
[58] Field of Search ............... 16/18 R, 18 B, 47, 48,
16/22, 23, 29, 31 R, 31 A, 37, 38, DIG. 33;
301/36 R; 280/485, 65; 403/224, 203, 225

[56] References Cited

U.S. PATENT DOCUMENTS

| | | | |
|---|---|---|---|
| 2,199,004 | 4/1940 | Lord | 403/203 |
| 3,076,980 | 2/1963 | Maguire | 16/22 X |
| 3,186,025 | 6/1965 | Kesterton | 16/18 R |
| 3,818,541 | 6/1974 | Daniels | 16/18 R |
| 3,904,300 | 9/1975 | Hetmann | 403/224 X |
| 3,967,342 | 7/1976 | Gebhard | 16/29 X |
| 4,092,760 | 6/1978 | Loewe | 16/29 X |
| 4,102,172 | 7/1978 | Iiyoshi | 16/31 R X |
| 4,120,071 | 10/1978 | Crescenzi | 16/47 X |

*Primary Examiner*—C. J. Husar
*Assistant Examiner*—Moshe I. Cohen
*Attorney, Agent, or Firm*—William A. Drucker

[57] ABSTRACT

A wheel support arrangement, for supporting a wheel axle in spaced relationship to a leg frame member, such as a leg of a baby carriage, has a resilient element which defines a support for an axle for one or more wheels, and which also defines a part, spaced from the wheel axle support, for its attachment to the leg frame. The resilient element is arranged to permit resilient deflection of the wheel axle support, relative to the leg frame attachment part, along three axes mutually at right angles.

11 Claims, 2 Drawing Figures

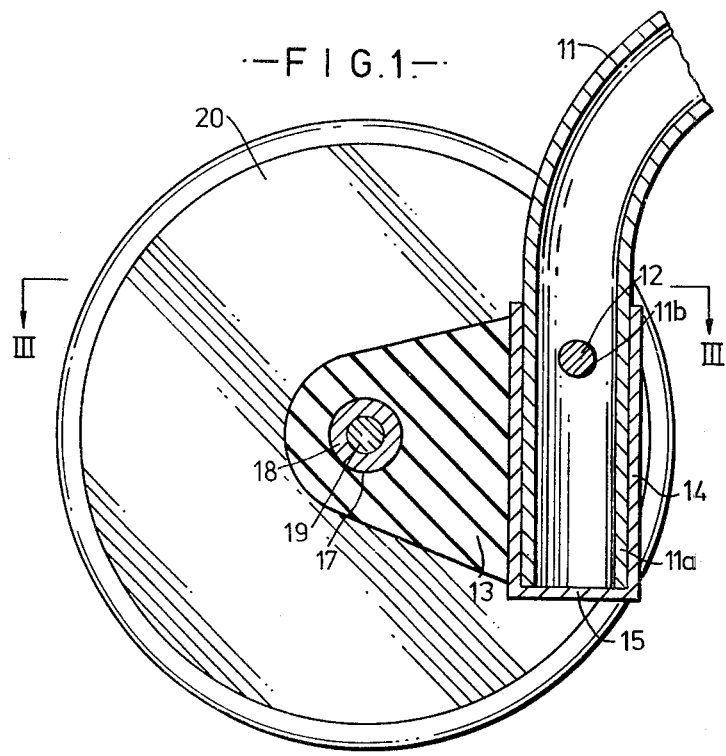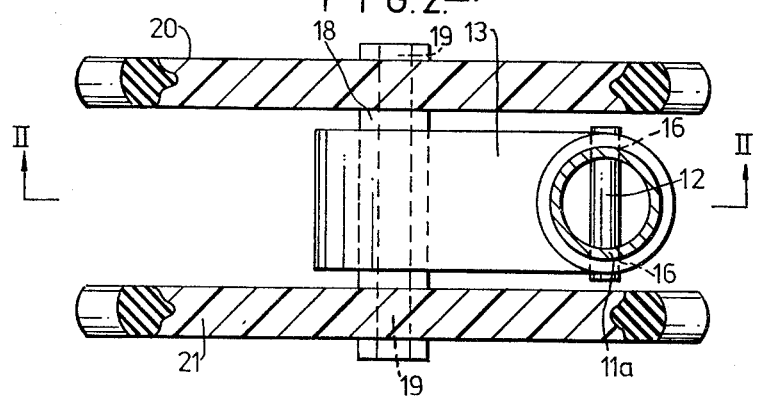

WHEEL SUPPORT ARRANGEMENTS

This invention relates to wheel support arrangements and has particular application to a wheel support arrangement for a baby carriage, golf trolley, supermarket trolley, or the like "small" wheel vehicle. In this specification the term "small" wheel means a wheel having a diameter less than 8 inches.

It is well known in the art that small wheels are very susceptible to vibration when traversing over an uneven floor and in, for example, the case of a baby carriage provided with 4 inch diameter wheels traversing over a paved area, the vibration of the wheels can transmit uncomfortable vibrations to the occupant and to the person pushing the vehicle.

To reduce vibrations transmitted from the wheels to the frame it is known to support each wheel axle in a wheel support arrangement, rigidly secured to the respective "leg" frame member, and which wheel support arrangement supports the rotational axis for the wheel displaced from the line of the leg whereby at least some part of the vibrations are applied as bending moments to the frame.

In a more recently proposed wheel support arrangement, intended to absorb substantially horizontal vibrations, the rigid wheel support arrangement secured to the "leg" of the frame includes a resilient body located in a substantially horizontal bore in the wheel support arrangement and in engagement with the "leg" frame member. The resilient member is generally in compression and therefore acts as a damper between the wheel support arrangement and the frame so that some further reduction of the vibrations transmitted to the frame is obtained. Nevertheless, even with this "damper" element, the reduction of vibrations transmitted to the frame remains a major problem.

A further difficulty with conventional wheel support arrangements is that the wheel axle is rigidly supported relative to the leg member and, with a vehicle presenting two forward and two rearward leg members with wheel support arrangements thereon and more particularly when each wheel support arrangement supports an axle with a wheel at each end thereof, the rigid support of the wheels result in uneven wear on the wheel tyres, bores and axles.

According to the present invention there is provided a wheel support arrangement, for supporting a wheel axle in spaced relationship to a leg frame member, comprising a resilient element between a wheel axle support and a leg frame attachment part, said element being arranged to permit resilient deflection of the wheel axle support along three axes relative to the leg frame attachment part.

Preferably said wheel axle support comprises a bore through said element for receiving a wheel axle or bearing for a wheel axle.

In one embodiment said leg frame attachment part comprises a surface presented by said element to directly engage, and be secured to, the leg frame member.

In an alternative embodiment said leg frame attachment part comprises an intermediate member secured to said element and conveniently said intermediate member may comprise a tubular member intended to be slidably inserted in, or on, said leg frame member. Preferably such an arrangement includes means for locking said intermediate member with said leg frame member. Said resilient element may conveniently comprise a body of resilient material, such as a rubber, rubber substitute, or plastics material.

In a preferred embodiment in accordance with the invention a wheel support arrangement for supporting a wheel axle in spaced relationship to a leg frame member comprises a block of resilient material bonded at one edge region to a tubular element and presenting, remote from said tubular element, a bore with a wheel axle bearing therein, said tubular element being intended to slidably receive a leg frame member therein. Preferably said tubular element is closed at its intended lower end.

The invention also envisages a wheel support arrangement, as defined for the above embodiments of the invention, in combination with a wheel axle and further in combination with one wheel or two wheels, conveniently arranged one on each side of the wheel support arrangement.

The present invention will now be described further by way of example with reference to the accompanying drawings in which:

FIG. 1. shows a cross section as shown through a cut through the solid block of the wheel support and, FIG. 2. shows an elevational cross section through the wheel support arrangement.

In the illustrated example a frame member 11, constituting a "leg" for the vehicle, includes a downwardly depending portion 11a to which a wheel support arrangement attaches. The portion 11a includes a transverse bore 11b for a retaining pin 12 for the wheel support arrangement.

The wheel support arrangement comprises a solid block 13 of rubber bonded along one end surface to a metal tube section 14 which is closed at its lower end by an end plate 15. The tube 14 includes a transverse bore 16 within which the retaining pin 12 can engage.

The block 13 also includes a bore 17, at right angles to the axis of tube 14, and within which an axle bearing 18 is located. As will be seen from FIG. 2. the bearing 18 has a length greater than the width dimension of the block 13 so that bearng 18 projects from both sides of the block 13.

An axle 19 is supported by bearing 18 and projects from both ends of the bearng 18 to support wheels 20 and 21. The wheels 20 and 21 may, in conventional manner, be rotatable on axle 19 or alternatively axle 19 may be rotatable in bearing 18 and the wheels 20 and 21 secured on axle 19.

When the wheel supporting arrangement illustrated is mounted on a leg frame member, such as a leg frame member for a baby carriage, the tube 14 surrounds the lower regions 11a of frame part 11 with the end of lower portion 11a engaging plate 15 and tube 14 is retained by passing securing pin 12 through aligned bore holes 16 and 11b.

In practice, the block 13 supports the axle 19 spaced from the axis of portion 11a in resilient manner so that the greater part of the vertical and transverse vibrations of wheels 20 and 21 transmitted to the wheel bearing 18 via axle 19 are absorbed by resilient deflection of the block 13. Further, as both wheels 20 and 21 are of the same size and mounted on the same axle and as the axle is resiliently supported by block 13, said axle can deflect angularly about a horizontal axis to assist in maintaining both wheels 20 and 21 under equal ground load to avoid the transmission of torsional vibrations via the axle 19 to leg frame member 11.

It has been found in practice that a wheel support arrangement of the type illustrated and capable of deflecting along three axes not only assists in absorbing vibrations applied to the axle 19 by the wheels 20 and 21 but, by allowing the axle 19 to deflect to maintain wheels 20 and 21 under equal ground load, a more uniform wear of wheels 20 and 21, with resulting longer tyre, bearing and axle life is obtained.

Further, because the wheel axle can deflect along three axes the steering of the vehicle is greatly improved relative to conventional fixed axle vehicles.

In the foregoing example the resilient element comprises a simple block of resilient material but the invention is not limited to this block structure and the resilient element may, for example, have different shape from that illustrated, be of composite structure to include materials of different resilience and even rigid materials, and the element may in fact be constructed from a rigid material, such as metal, where the element has the form of a leaf or coil spring.

I claim:

1. A wheel support arrangement for supporting a wheel axle in spaced relationship to a leg frame member, comprising an elastomeric element defining a wheel axle journal support portion at one end and a leg frame attachment saddle portion defining its other end spaced from said wheel axle support, said elastomeric element being arranged to permit resilient deflection of said wheel axle support along three axes relative to said leg frame attachment part.

2. A wheel support arrangement as claimed in claim 1 and wherein said wheel axle support comprises a bore through said resilient element for receiving a wheel axle or a bearing for a wheel axle.

3. A wheel support arrangement as claimed in claim 1 and wherein said leg frame attachment part comprises a surface presented by said resilient element to directly engage, and be secured to, said leg frame member.

4. A wheel support arrangement, as claimed in claim 1, wherein said leg frame attachment part is secured to an intermediate member adapted for attachment to a leg frame member.

5. A wheel support arrangement as claimed in claim 1 and wherein said resilient element comprises a body of resilient material.

6. A wheel support arrangement as claimed in claim 1 and wherein the resilient element is made from a rubber, rubber substitute, or resilient plastics material.

7. A wheel support arrangement, for supporting a wheel axle in spaced relationship to a leg frame member, comprising an elastomeric element defining a wheel axle journal support portion, and a leg frame attachment saddle portion defining its other end spaced from said wheel axle support, said leg frame attachment part being secured to a tubular member, and said elastomeric element being arranged to permit resilient deflection of the wheel axle support along three axes relative to said tubular member.

8. A wheel support arrangement as claimed in claim 7 and wherein said wheel axle support comprises a bore through said element for receiving a wheel axle or a bearing for a wheel axle.

9. A wheel support arrangement as claimed in claim 7 and including means for locking said tubular member with a leg frame member.

10. A wheel support arrangement as claimed in claim 7 and wherein said resilient element comprises a body of resilient material.

11. A wheel support arrangement, for supporting a wheel axle in spaced relationship to a leg frame member, comprising a generally flat block of elastomeric resilient material bonded at one edge region by way of a saddle portion to a tubular member and presenting adjacent another edge remote from said tubular member a bore defining a wheel axle journal support portion with a wheel axle bearing therein, said tubular member being intended to slidably receive a leg frame member therein.

* * * * *